United States Patent [19]
Minteer

[11] Patent Number: 5,934,317
[45] Date of Patent: Aug. 10, 1999

[54] PRESSURE COMPENSATED FLOW CONTROL VALVE

[75] Inventor: Daniel J. Minteer, West Richland, Wash.

[73] Assignee: Fluor Daniel Hantford, Inc., Richland, Wash.

[21] Appl. No.: 08/650,080

[22] Filed: May 17, 1996

[51] Int. Cl.⁶ ................................................ G05D 7/01
[52] U.S. Cl. ............................................................. 137/504
[58] Field of Search .................................... 137/504, 501; 454/26, 255

[56] References Cited

U.S. PATENT DOCUMENTS

| | | | |
|---|---|---|---|
| 3,590,861 | 7/1971 | Chittenden et al. | 137/504 X |
| 3,805,824 | 4/1974 | Robbins | 137/504 |
| 3,854,497 | 12/1974 | Rosenberg | 137/504 X |
| 4,080,993 | 3/1978 | Lind | 137/504 |
| 5,000,219 | 3/1991 | Taube et al. | 137/504 X |
| 5,000,221 | 3/1991 | Palmer | 137/505.38 |

FOREIGN PATENT DOCUMENTS 254544  5/1967  Australia ................................ 137/504

*Primary Examiner*—Stephen M. Hepperle
*Attorney, Agent, or Firm*—Veo Peoples, Jr.; J. William Stader

[57] ABSTRACT

The invention is an air flow control valve which is capable of maintaining a constant flow at the outlet despite changes in the inlet or outlet pressure. The device consists of a shell assembly with an inlet chamber and outlet chamber separated by a separation plate. The chambers are connected by an orifice. Also located within the inlet chamber is a port controller assembly. The port controller assembly consists of a differential pressure plate and port cap affixed thereon. The cap is able to slide in and out of the orifice separating the inlet and outlet chambers. When the pressure differential is sufficient, the differential pressure plate rises or falls to maintain a constant air flow. Movement of the port controller assembly does not require the use of seals, diaphragms, tight tolerances, bushings, bearings, hinges, guides, or lubricants.

2 Claims, 5 Drawing Sheets

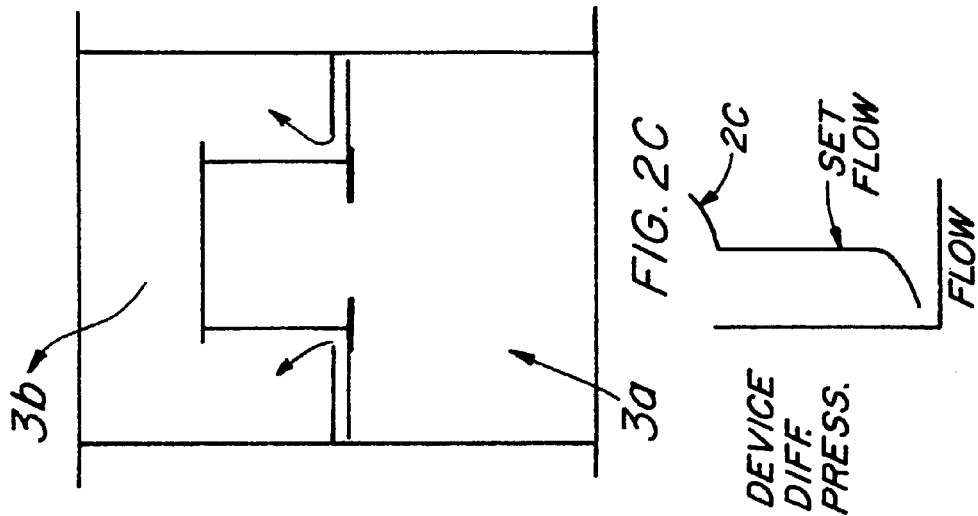
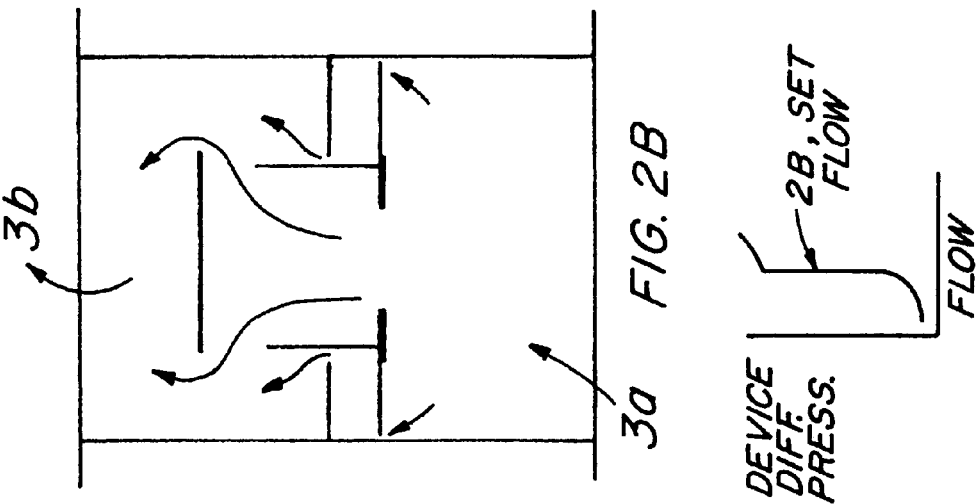
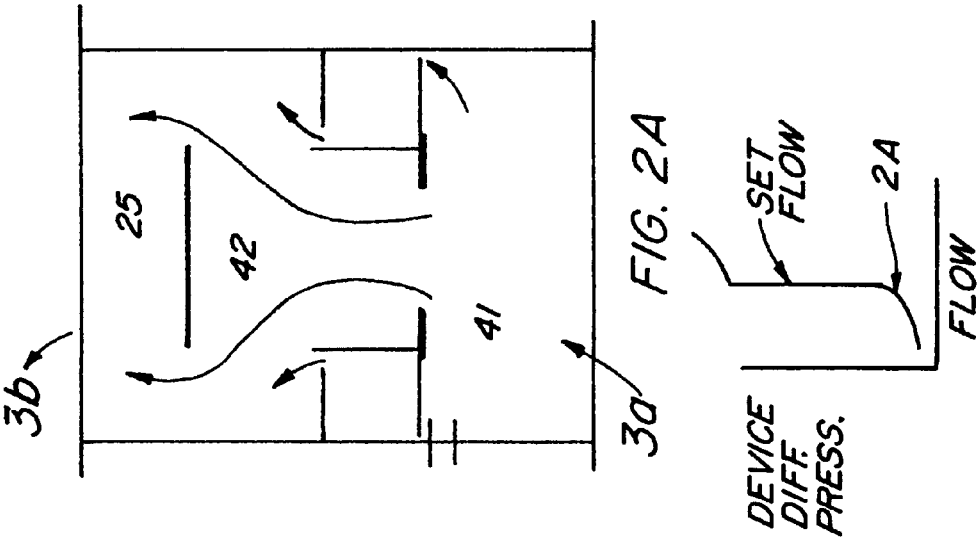

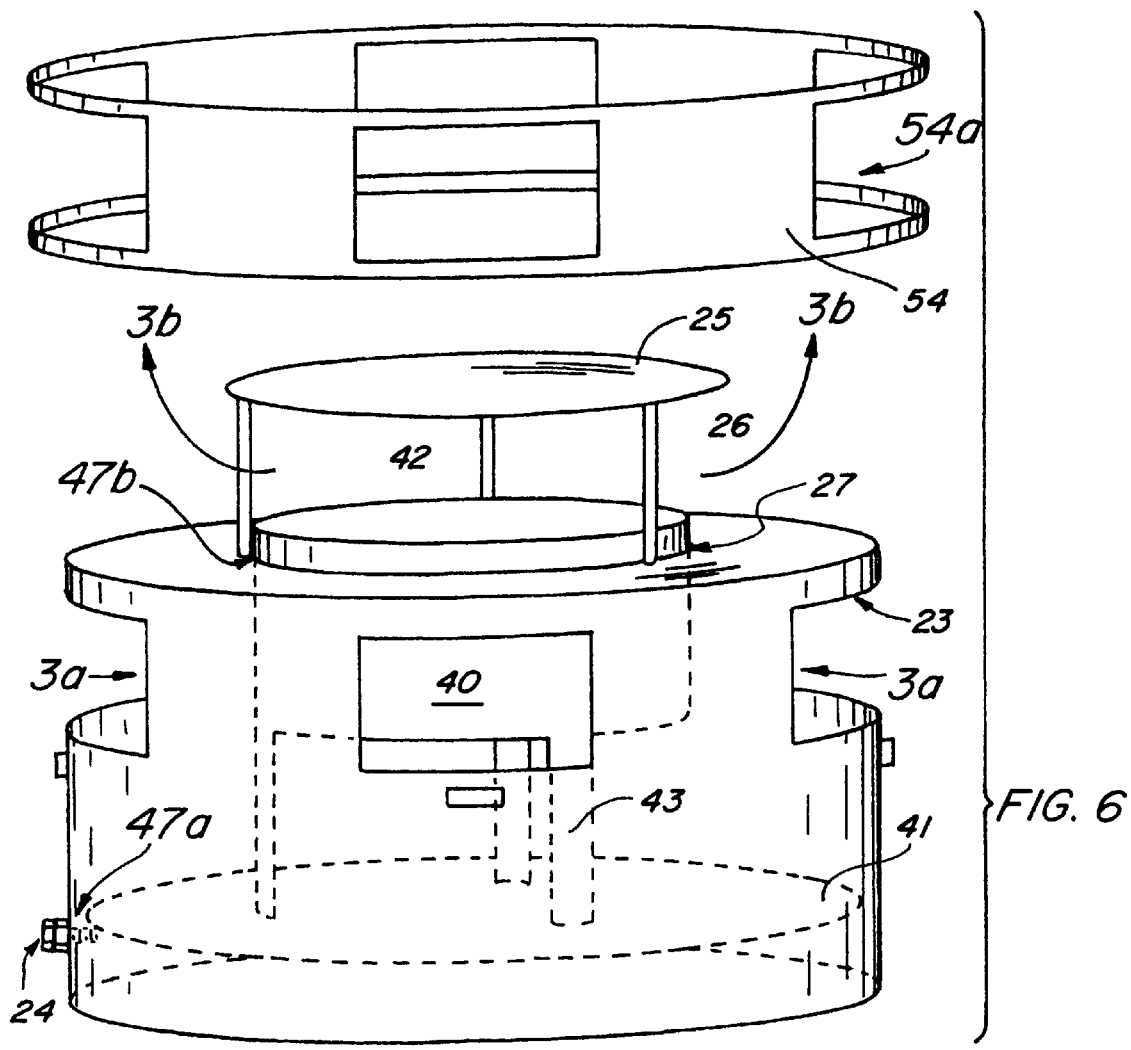
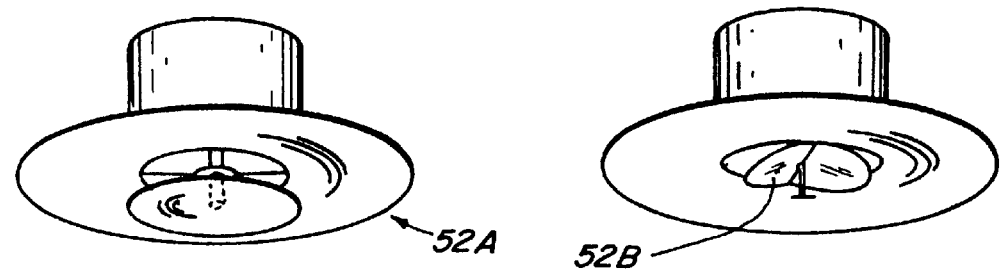
FIG. 6
FIG. 7A  FIG. 7B

PRESSURE COMPENSATED FLOW CONTROL VALVE

BACKGROUND OF INVENTION

1. Field of Invention

The U.S. government has a paid-up license in this invention and the right in limited circumstances to require the patent owner to license others on reasonable terms as provided for by the terms of contract No. DE-AC06-87RL10930 awarded by the United States Department of Energy.

This invention relates to the field of passively operated air flow control devices. More particularly to valves which maintain a constant air flow rate regardless of changes in the pressure at the inlet or outlet.

2. Description of Prior Art

Devices which maintain a constant air flow regardless of changes in the inlet or outlet pressures are referred to as constant air flow controllers or valves. Constant air flow control devices have a variety of uses in ventilation control systems. Currently there are several situations where maintaining a constant air flow despite varying pressures would be useful.

Currently, exhaust ventilation must be provided for any space in any facility in which gases, odors, noxious vapors, excessive heat or airborne particulates which are undesirable or pose a health hazard to the workers or the public are produced. Examples of such spaces may include: food, chemical or waste storage buildings; Waste processing buildings; vats, tanks, or rooms; enclosures for heat-producing equipment such as furnace, forges; laboratories; hospitals; classrooms and auditoriums; indoor swimming pools; wood and metalworking shops; welding booths; auto and equipment repair shops; kitchens; laundries; bathrooms and locker rooms.

In such spaces it is usually necessary to maintain a slight negative pressure relative to the surrounding spaces to remove the unwanted odor or hazardous substance. The pressure and air change rate in a given volume can be satisfied through the precise regulation of the air flow rate into or out of the ventilated space.

Conventional methods of controlling flow rates in exhaust ventilation systems involve the use of dampers in conjunction with a fan. These dampers are controlled either manually or automatically. However there are drawbacks to using dampers to control the ventilation in a given space. First, the task of controlling ventilation system flow rates with manual or weighted dampers can be difficult and continual. This is because the flow rates are easily affected by changes in system pressure, barometric pressure, wind velocities or system cleanliness (i.e., dirty filters). The second drawback is that air or motor operated valves or dampers which automatically control air flow rates are effective, but can be expensive to install.

Besides the use of flow valves in the exhausting of unwanted gases, a constant flow valve offers tremendous advantages in a forced-air heating and air conditioning system. Such heating and air conditioning systems are common in homes and office complexes.

In current practice, when forced-air heating and air conditioning systems are designed for offices and homes, air flow rates are calculated and the correct sizes heating and air conditioning unit are installed. When installation is completed, individual vents are adjusted from one room of office to another to equalize temperature.

But if, for example, the occupant of one office is too warm and closes a vent to cool the room, more warm air flows into other offices. This makes these offices too warm. Soon, adjustments are being made from one office to another. This results in the entire system being thrown out of balance and the occupants are uncomfortable. Sometimes a comfortable balance can be reached, but as soon as one more adjustment is made, or when the air conditioning is turned on, the whole cycle of adjustment repeats itself.

An economical air flow valve which could be designed to be placed in an individual room and that could be adjusted to maintain a desirable air flow without interfering with the air flow in other rooms would be an enormous improvement in the environment of many facilities.

The current art has attempted to provide several means to maintain a constant air flow rate, however, there are drawbacks.

One of the more advanced attempts to maintain a constant air flow involves the use of a sealed piston to exert a force necessary to regulate a flow area. Such a design is illustrated by U.S. Pat. No. 5,000,221 (Palmer). However, there are several drawbacks to the Palmer design. In order for Palmer to maintain a constant mass flow at the outlet port, a seal must be provided between the piston and its mounting structure to prevent internal venting. The sealing methods described include the use of a diaphragm, a magnetic sealing fluid, or a fine machined tolerance between the piston and piston mounting structure. This seal makes the design unnecessarily complex and inhibits accuracy and reliability (due to the risk of failing or worn sealing mechanisms). The fine machined tolerance, besides being expensive can result in increased sensitivity to dirt or deposits. The dirt or deposits can cause great inaccuracies by preventing the piston from moving freely. However, relaxing this tolerance could allow too much leakage within the device and result in failure to maintain a constant mass flow through the device. Additionally, the Palmer device will not operate when the pressure at the outlet port is less than 2" wg. Finally, the maximum flow capacity of the Palmer device is 200 scfm.

OBJECTS OF THE INVENTION

It is an object of the present invention to provide a flow control valve which can maintain a constant flow rate of air despite changes in pressure at the inlet or outlet.

It is a further object of the present invention to provide a flow control valve which may be passively operated (without the use of an external power source).

It is a further object of the present invention to provide a more reliable flow control valve which does not require seals, diaphragms, or close tolerances.

It is a further object of the present invention to provide a flow control valve capable of operating at very low differential pressure and very high flow capacity.

It is a further object of the present invention to provide a simpler design for easier fabrication of a flow control valve.

It is a further object of the present invention to provide a flow control valve which may be installed in existing ventilation systems.

It is a further object of the present invention to provide a flow control valve that does not require a complex piston or mechanical linkages to maintain a constant flow.

It is a further object of the present invention to provide a flow control valve which may allow the air flow to be easily altered.

SUMMARY OF THE INVENTION

The present invention is an apparatus and method which overcomes the deficiencies in the prior art. The device is a flow control valve which is capable of maintaining a constant flow of air despite changes in pressure at the inlet or outlet. The valve consists of a shell assembly with an inlet chamber and an outlet chamber separated by a separation plate. There is an orifice connecting the two chambers. Inlet air enters through an inlet opening and passes through the orifice and into the outlet chamber. The air exits the outlet chamber by an outlet opening.

Responding to variations in the pressure is a port controller assembly located primarily within the inlet chamber. The port controller assembly has a differential pressure plate which has a port cap affixed. The port cap is capable of sliding in and out of the orifice, depending on pressure variations. A flow adjustment means sets the amount of air flow desired. Any variations from the set air flow passing through the inlet chamber quickly moves the port controller up or down to return flow to its setting.

The flow adjustment means in the primary embodiment consists of an air inlet collar which is adjusted by a mechanical linkage. The collar is placed in front of the inlet opening. In the alternative, the collar can also be electrically or pneumatically adjusted by a remote control control system.

The flow adjustment means in the secondary embodiments consist of another orifice located in the differential pressure plate. There are several adjustment means for this orifice. Specifically, there are orifice plates which can be affixed onto the differential pressure plate or conventional meter port covers.

In both embodiments, the design can be scaled larger or smaller to manipulate the device's operating capabilities. Further, the port controller can be made heavier or lighter with weights or by material selection also manipulating the device's operating range of flow and differential pressure.

BRIEF DESCRIPTION OF THE DRAWINGS

FIG. 2A is a side view which illustrates the general operation of the present invention when the differential pressure (inlet minus outlet) is less than the minimum required to operate the device.

FIG. 2B is a side view which illustrates the general operation of the present invention under normal operation. The port controller may be located anywhere between 2A and 2C, depending on differential pressure.

FIG. 2C is a side view which illustrates the general operation of the present invention when the differential pressure reaches the maximum limit of operation.

FIG. 6 is a cut-away side view of the primary embodiment of the present invention.

FIG. 7A is a bottom view of a secondary embodiment of the orifice adjustment means of the present invention.

FIG. 7B is a bottom view of a secondary embodiment of the orifice adjustment means of the present invention.

DETAILED DESCRIPTION OF THE INVENTION

Figure 1:
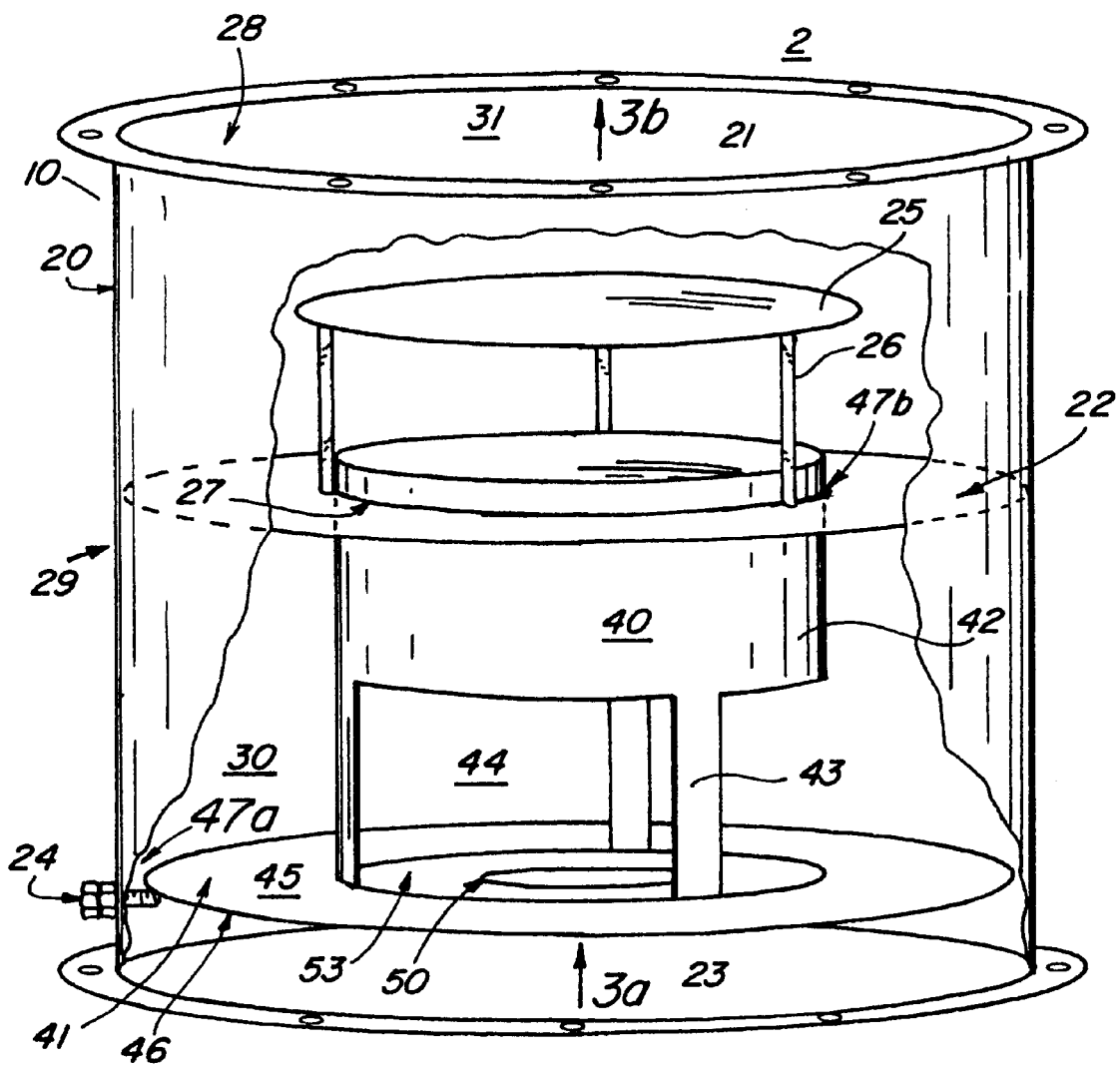
FIG. 1 is a cut-away side view which illustrates the major elements of the present invention, secondary embodiment.
Figure 3:
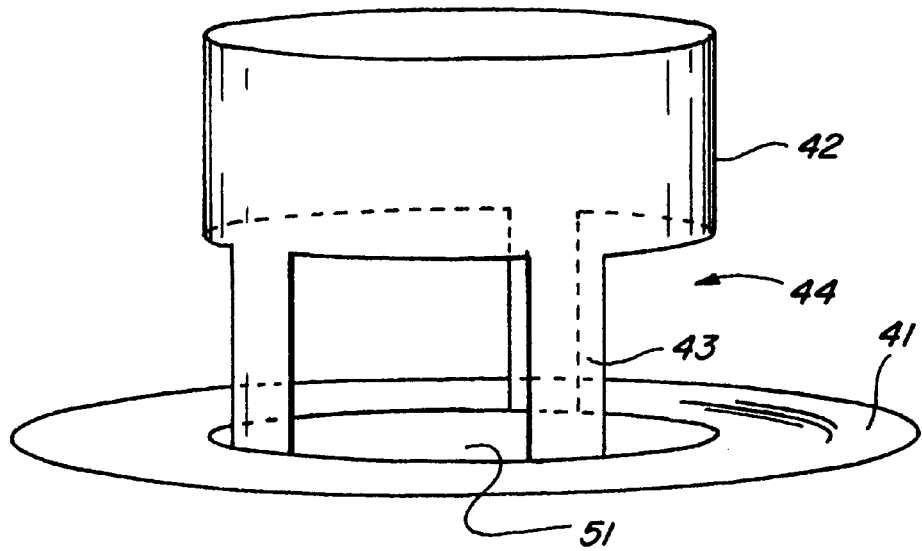
FIG. 3 is a side view of the port controller assembly of the present invention, second embodiment.
Figure 4:
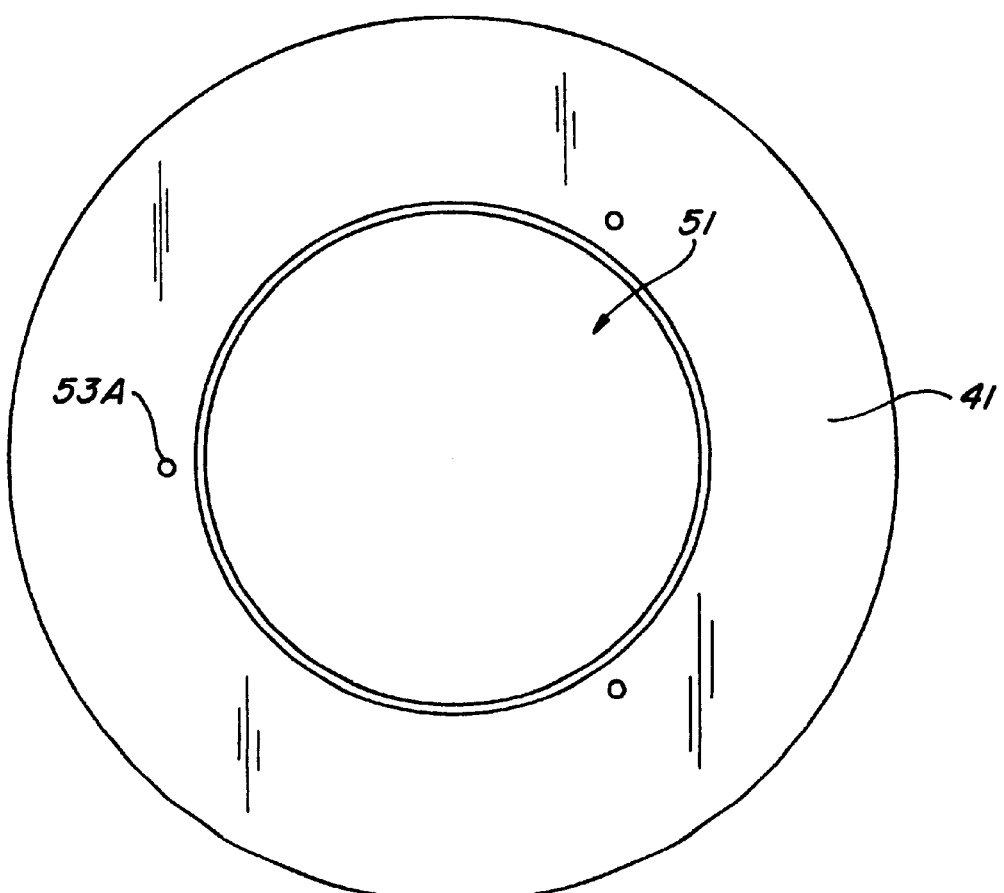
FIG. 4 is a bottom view of the differential pressure plate of the present invention, secondary embodiment.

Referring to the figures, it is possible to view the various major elements constituting the present invention 10. The major elements and general operation will be briefly reviewed. A more in-depth discussion will follow later in the disclosure. The flow control valve consists of a shell assembly 20. The shell assemble has an inlet chamber 30 and an outlet chamber 31 separated by the separation plate 22. The inlet and outlet chambers are connected to each other by the shell cap orifice 27. Air enters 3a the shell assembly and the inlet chamber by the air inlet opening 23. The air passes through the port controller assembly 40 and the shell cap orifice 27 to the outlet chamber 31 ultimately exiting the shell assembly and outlet chamber 31 by the outlet opening 21. A constant flow of air, despite pressure changes, is maintained by the port controller assembly 40 which is primarily located within the inlet chamber 30. Depending on the pressure relative to the inlet and outlet chambers, the port controller 40 adjusts to maintain a constant flow rate.

Now that the general operation and major elements have been reviewed, it is possible to discuss the invention in greater detail.

The shell assembly 20 consists of an interior 28 and an exterior 29. Located within the interior 28 is an inlet chamber 30 and outlet chamber 31. These two chambers are separated by the separation plate 22. Connecting the two chambers is the shell cap orifice 27. Air from the exterior enters the inlet chamber 30 through the air inlet opening 23 and ultimately passes through the port controller assembly 40 and shell cap orifice 27 into the outlet chamber 31. The air departs the interior of the shell assembly and the outlet chamber by the outlet opening 21. Positioned in the inlet chamber 30 is the plate rest 24. Located in the outlet chamber and attached to the separation plate is the shell cap 25. The shell cap is supported by several supports 26. The supports are spaced along the perimeter of the shell cap orifice 27. The shell cap is slightly larger than the shell cap orifice. In the embodiments, the shape is circular and approximately 6½ inches in diameter. However, the shape and size can vary, depending on the flow and pressure desired to be maintained.

The port controller assembly 40 is primarily situated within the inlet chamber 30. It consists of a differential pressure plate 41. A port cap 42 is attached to the top of the differential pressure plate 41 by several port cap supports 43. The base of the differential pressure plate is indicated by item 46. The roughly rectangular area defined between the differential pressure plate, the port cap supports and the port cap is the port cap orifice 44. The gap between the differential pressure plate and interior of the shell assembly and the gap between the shell cap orifice and the port cap are indicated by items 47a and 47b, respectively. In the secondary embodiments, the air flow adjustment means 52A, 52B, or 53 is contained on the differential pressure plate. (These adjustment means will be discussed below.) In the primary embodiment, air flow adjustment means 54 is located on the exterior 29 of the shell assembly. The determination of the type of flow adjustment means 52A, 52B, 53 and 54 depends on the type of flow control desired. The types of flow control means will be discussed in the embodiments below. When assembled, the port cap 42 of the port controller assembly 40 will be inserted into the shell cap orifice 27. During operation (see FIG. 2), the port cap 42 and differential pressure plate (41) (as connected by the port cap supports 43 will rise or fall depending on changes in the inlet pressure relative to the outlet pressure. The inlet air 3a passes through the orifice 50 in the orifice plate 53 affixed by attaching to the differential pressure plate 41 at 50A. The inlet air also passes around the clearance 47A between the differential pressure plate and the interior 28 of the shell assembly 20. The air then passes through the clearance 47B between the port cap 42 and the separation plate 22. Some air also passes through the horizontal port cap orifice 48. Unlike prior air flow valves, the clearances 47A and 47B require no seals and the air flow moves around the entire perimeter of the differential pressure plate and the port cap. This results in the port controller assembly being "self-centered", negating the need for a lubricant or centering mechanism. The main air path, however, is through orifice 50. The air enters the outlet chamber 31 by the clearances 47(b) between the port cap 42 and the separation plate 22. Air also enters through the horizontal port cap orifice 48. From the outlet chamber 31 the air exits 3b, the shell assembly by the outlet opening 21. If the air pressure is insufficient to lift the differential pressure plate, the plate will rest on the plate rest 24. The minimum device differential pressure required to lift the port controller assembly is a function of its weight and the area of the differential pressure plate, both easily manipulated (i.e., by selecting lightweight materials or using thinner gauge material, and/or increasing the differential pressure plate area). Thus, the flow control valve can be designed to operate at very low system static pressures (i.e., well below the ⅓" wg (shown in 16 gauge aluminum prototype tests). Essentially, the entire invention can be constructed using 16-gauge sheet aluminum or nearly any other lightweight material and conventional attachment devices.

Figure 5:
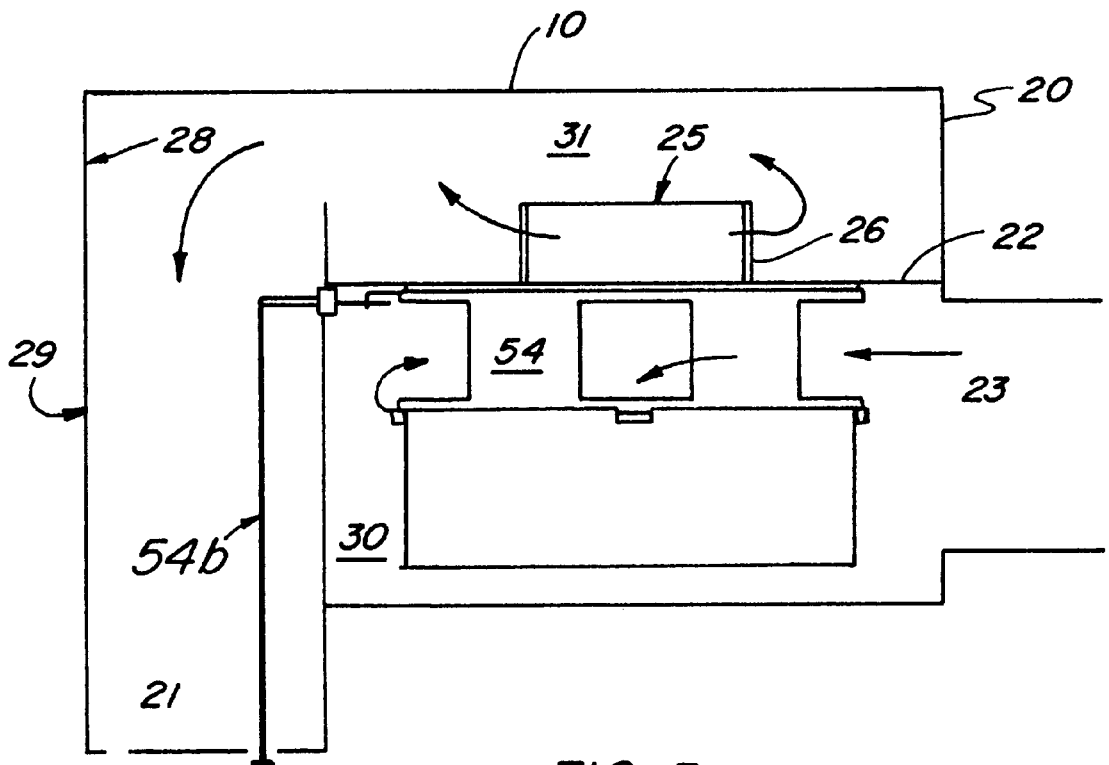
FIG. 5 is a cut-away side view of a primary embodiment of the present invention.
Figure 8:
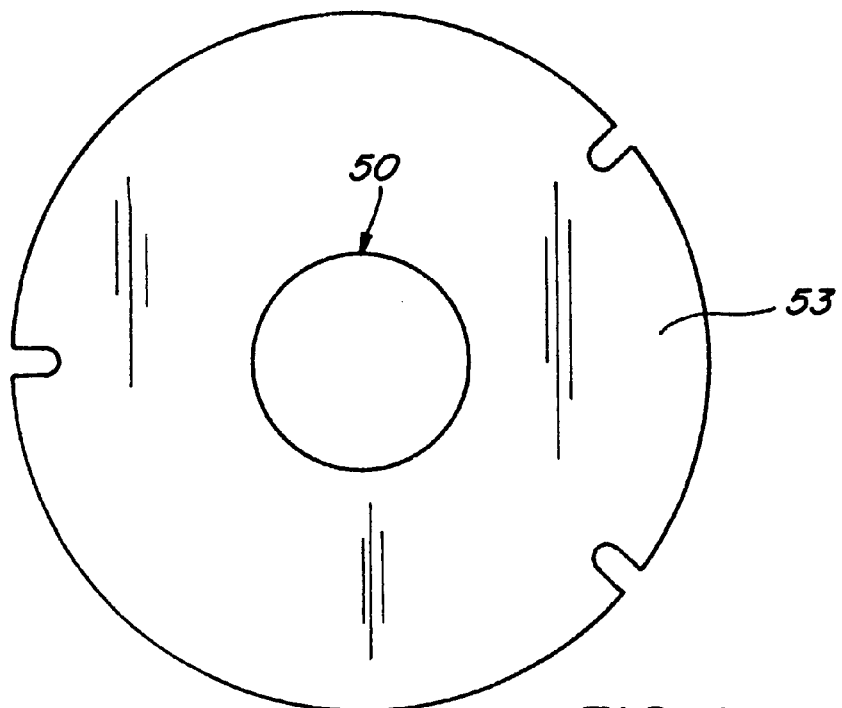
FIG. 8 is a bottom view of the plate adjustment means of the present invention, secondary embodiment.

The primary embodiment is illustrated in FIGS. 5 and 6. The air flow adjustment means in this embodiment is an air flow inlet collar 54 which is placed in front of the inlet opening 23. The collar 54 has open areas 54a. In this embodiment the open areas are rectangular. An occupant can adjust the collar 54 by a mechanical linkage 54b, or it can be electrically or pneumatically controlled via a central control system. The linkage rotates the collar to alter the flow of air. Once the flow is adjusted, changes in pressure will not effect the flow rate of the outlet air 3b. The rising or falling of the port controller within the shell assembly prevents this occurrence. Depending on the clearances 47A and 47B, the material and weight of the port controller assembly, and size of the differential pressure plate, this embodiment can accommodate device differential pressures ranging well below the ⅓" wg (as shown in prototype tests using 16 guage aluminum) to fan capacity. Depending on the clearances 47A and 47B and the scale of the design, the primary embodiment can accommodate air flow rates ranging from 25 cfm to fan capacity. The shell assembly is designed to be placed in conjunction with ordinary ventilation ducting.

The secondary embodiments involve flow adjustment means which alter an aspect of the differential pressure plate 41. The flow rates can still be altered after initial adjustment, but not with the ease as shown in the primary embodiment. The differential pressure plate 41 in all secondary embodiments has a differential plate orifice 51 located in the center of the differential pressure plate 41. All secondary embodiments also possess a orifice adjustment means 52A, 52B, or 53. The orifice adjustment means consists of a means to alter the area of the differential pressure plate orifice. The area of the orifice 50 can be determined by the following equation:

Required Orifice Diameter (inches)=0.3137×[Desired Flow (CFM)−1.476)]$^{1/2}$

This formula is based on a circular shell assembly with an inner diameter of 12 inches, a circular shell cap orifice of 6 inches, an aluminum port cap of 6 inches diameter (however, of sufficient clearance to allow sliding through to shell cap orifice) and 4" tall, and an aluminum differential pressure plate diameter of 12 inches (again capable of easy movement within the shell assembly). Using 52A or 52B, the area of the orifice can be adjusted by a conventional meter port cover. 52a is a 'screw', adjusted port cover, and 52b is a 'butterfly' adjusted port cover. These mechanisms are common in the heating and ventilation ducting art.

It will be obvious to those skilled in the art that various changes may be made without departing from the scope of the invention and the invention is not to be considered limited to what is illustrated in the drawings and described in the specification.

What is claimed is:

1. An air flow control valve comprising:
   a. a shell assembly with an exterior and an interior, said interior further comprising:
      (i) an inlet chamber and an outlet chamber separated by a separation plate;
      (ii) an inlet opening, therein, said opening connecting the inlet chamber to the exterior;
      (iii) an outlet opening, therein, said opening connecting the outlet chamber to the exterior
      (iv) said separation plate having a shell cap orifice, therein, said orifice connecting the inlet chamber to the outlet chamber;
      (v) a shell cap affixed to the separation plate, said cap projecting into the outlet chamber; and
      (vi) a plate rest located in the inlet chamber;
   b. a port controller assembly within the inlet chamber further comprising:
      (i) a differential pressure plate;
      (ii) a port cap fixed to the differential pressure plate and said port cap inserted in the shell cap orifice; and
      (iii) a means for adjusting the airflow, said means comprising an air inlet collar for adjusting volume at said inlet, and a linkage connected to said collar, wherein flow control is achieved at device differential pressures ranging from ⅓" wg to fan capacity, and air flow rate is achievable at from 25 scfm to fan capacity.

2. An air flow control valve comprising:
   a. a shell assembly with an exterior and an interior, said interior further comprising:
      (i) an inlet chamber and an outlet chamber separated by a separation plate;
      (ii) an inlet opening, therein, said opening connecting the inlet chamber to the exterior;
      (iii) an outlet opening, therein, said opening connecting the outlet chamber to the exterior
      (iv) said separation plate having a shell cap orifice, therein, said orifice connecting the inlet chamber to the outlet chamber;
      (v) a shell cap affixed to the separation plate, said cap projecting into the outlet chamber; and
      (vi) a plate rest located in the inlet chamber;
   b. a port controller assembly within the inlet chamber further comprising:
      (i) a differential pressure plate;
      (ii) a port cap fixed to the differential pressure plate and said port cap inserted in the shell cap orifice; and
      (iii) a means for adjusting the airflow, said means comprising an orifice inside the differential pressure plate and a weight added to the port controller which weight serves as an orifice adjustment means, wherein flow control is achieved at device differential pressures ranging from ⅓" wg to fan capacity, and air flow rate is achievable at from 25 scfm to fan capacity.

* * * * *